United States Patent [19]

Lin et al.

[11] 4,328,138

[45] May 4, 1982

[54] CURABLE N-ACYLUREA POLYMERS AND COATING COMPOSITIONS THEREFROM

[75] Inventors: Shiow-Ching Lin, Columbia, Md.; Gerry K. Noren, Hoffman Estates, Ill.

[73] Assignee: DeSoto, Inc., Des Plaines, Ill.

[21] Appl. No.: 213,002

[22] Filed: Dec. 4, 1980

[51] Int. Cl.³ .................. C08G 18/68; C08L 91/00
[52] U.S. Cl. ................ 525/451; 260/404.5 R; 528/49; 528/55; 528/56; 528/67; 528/75; 528/392
[58] Field of Search ............ 528/67, 75, 49, 392; 260/18 TN, 404.5 R

[56] References Cited

U.S. PATENT DOCUMENTS 2,574,864 11/1951 Eckey et al. ............... 260/404.5 R
2,853,473 9/1958 Campbell et al. .................. 528/51
3,639,353 2/1972 Brown .......................... 260/77.5 R
4,042,558 8/1977 Von Bonin et al. ............. 260/37 N

OTHER PUBLICATIONS

Jour. Org. Chem. 28, No. 8, (Aug. 1963), pp. 2069–2075.
Jour. Polymer Sci. Part B (Polymer Letters), vol. 6, (1968), pp. 517–522.

*Primary Examiner*—H. S. Cockeram
*Attorney, Agent, or Firm*—Dressler, Goldsmith, Shore, Sutker & Milnamow, Ltd.

[57] ABSTRACT

Curable N-acylurea polymers and coating compositions are provided which cure by reaction of ethylenic unsaturation of the acyl group. The subject polymers are prepared by reaction of a polymeric carbodiimide with an ethylenically unsaturated monocarboxylic acid. Coating compositions so provided may have N-acylurea polymer solids contents of about 30% to about 95% by weight, exclusive of pigment.

4 Claims, No Drawings

CURABLE N-ACYLUREA POLYMERS AND COATING COMPOSITIONS THEREFROM

DESCRIPTION

TECHNICAL FIELD

The present invention relates to novel organic polymers containing N-acylurea repeating units having curable ethylenically unsaturated groups pendant therefrom, and particularly to high solids, air drying coating compositions prepared therefrom.

BACKGROUND

High molecular weight air drying organic film-forming polymers and coating compositions are well-known in the art. However, because of the high molecular weight and resulting high viscosity of compositions containing these film-forming polymers, high molecular weight polymers are generally utilized in organic solvent solution coating compositions at about 40 percent by weight, exclusive of any pigment which might be present. The use of such a relatively low polymer solids content, therefore requires a relatively high content of solvent, and solvents are expensive, add cost to shipping per area of substrate coated, and offer a possible fire hazard.

The reaction of bis-carbodiimides with bis-carboxylic acids has been used by Iwakura et al. [(*Polymer Letters*, 6, 517–522 (1968)] to prepare poly(N-carbamoylamides). The preparation of organic polymers containing repeating carbodiimide groups has been reported by several workers. See Campbell et al *J. Org. Chem.*, 28, 2069–2075 (1968), and U.S. Pat. No. 2,853,473. However, these do not suggest the production of unsaturated, curable polymers.

DESCRIPTION OF THE INVENTION

According to the present invention, organic polymers are prepared which contain N-acylurea repeating units having a pendant, curable ethylenically unsaturated group bonded to the urea group through the acyl carbonyl group. These N-acylurea polymers form ethylenically unsaturated films which can be cured by polymerization or by oxidative drying. The low molecular weight of the polymer presumably contributes to the observed low viscosity for relatively concentrated solution compositions. Thus, the polymers of this invention are useful in coating compositions when present at relatively high concentrations, which may be as high as about 90 weight percent or higher, exclusive of pigments.

Because of the high solids and low organic solvent contents of the coating compositions of this invention, not only are benefits derived from shipping costs per area of substrate coated and from reduced possibilities of fire hazard, but the compositions of this invention also provide fewer potential difficulties with environmental standards for solvent vapors. In addition, cured coatings prepared from the polymers of this invention exhibit superior initial film hardness, quick curing and corrosion resistance.

The polymers of this invention are preferably the polymeric product of (1) an organic polymer comprising repeating units containing a single carbodiimide group reacted with (2) an ethylenically unsaturated monocarboxylic acid; the ethylenic unsaturation allowing subsequent addition polymerization or oxidative drying of the unsaturated polymeric product to cure the coating. It is particularly preferred that substantially all of the carbodiimide groups are consumed in the reaction with the ethylenically unsaturated monocarboxylic acid, so the ethylenically unsaturated monocarboxylic acid is used in at least stoichiometric proportion based on the monocarboxylic acid functionality.

Organic polymers containing carbodiimide groups are known in the art. In preferred practice herein, the repeating units comprising a single carbodiimide group are uniformly distributed throughout the organic polymer so that repeating units comprising the unsaturated N-acylurea group (the reaction product of the carbodiimide group combined with an unsaturated monoacid) are also uniformly distributed throughout the polymer. Methods for the preparation of the preferred polymers with uniformly distributed carbodiimide groups are also known in the art.

According to one synthetic method, an aliphatic or aromatic diisocyanate, such as isophorone diisocyanate or 2,4-toluene diisocyanate, is reacted with itself to prepare a polymer containing a plurality of uniformly distributed carbodiimide groups throughout the polymer chain. In a more preferred procedure, two moles of the diisocyanate are reacted with one mole of a dihydrogen atom source, such as a dihydric alcohol, a di-secondary amine, or a secondary aminoalcohol, to prepare an oligomeric diisocyanate which is then reacted with itself to form the organic polymer comprising repeating units containing uniformly distributed carbodiimide groups. When uniformly distributed carbodiimide groups are not desired, the above dihydrogen atom sources may be mixed.

In most preferred practice, a dihydric alcohol is reacted with the diisocyanate to first form an oligomeric diisocyanate which is then further reacted with itself to form an isocyanate-terminated carbodiimide-containing polymer. Preferably, the dihydric alcohol used has a molecular weight of about 60 to about 1500. Most preferably, the dihydric alcohol is a polyoxyethylene glycol or polyoxypropylene glycol having a molecular weight of about 200 to about 1,000.

The isocyanate-terminated carbodiimide-containing polymer is end capped with a monoisocyanate, as is known in the art to form carbodiimide groups near the polymer termini. The monoisocyanate may be provided by the reaction of a monohydric alcohol, such as isopropanol, or a substituted phenol, such as 2,6-di-tert-buryl-p-cresol with the diisocyanate, or by a monoisocyanate such as phenyl isocyanate. Thus, the organic polymer comprising a plurality of carbodiimide groups is prepared by reacting a diisocyanate with a dihydrogen atom source to form an oligomeric diisocyanate. The oligomeric diisocyanate is then further reacted with itself and with a monoisocyanate to convert the isocyanate groups present into a plurality of carbodiimide groups.

As is also well-known in the art, phospholene oxide catalysts are useful in the conversion of diisocyanates into organic polymers containing a carbodiimide group. In most preferred practice, the catalyst selected is 1-phenyl-3-methyl phospholene-1-oxide.

The polymeric carbodiimide so-produced suitably has an average of about 2.5 to about 6 carbodiimide groups present per polymer molecule. In more preferred practice, there are an average of about 3 to about 4 carbodiimide groups present per molecule. As it is particularly preferred that all of the carbodiimide groups present be consumed by reaction with the ethylenically unsaturated monocarboxylic acid, the resulting N-acylurea polymers suitably contain an average of about 2.5 to about 6 urea repeating units and the same number of ethylenically unsaturated acyl groups per molecule. More preferably, there are about 3 to about 4 ethylenically unsaturated acyl groups per molecule bonded through the acyl carbonyl group to the same number of urea groups.

Examining the curable N-acylurea organic polymers of this invention more closely, it is seen that the polymer chains are comprised of a plurality of groups containing the structural formula:

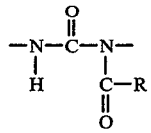

wherein

is an ethylenically unsaturated acyl group.

The ethylenically unsaturated monocarboxylic acids useful herein for providing ethylenic unsaturation to the N-acylurea polymer

include carboxylic acids containing mono- and polyethylenic unsaturation, and mixtures thereof. Examples of useful monocarboxylic acids containing monoethylenic unsaturation include acrylic acid, methacrylic acid, crotonic acid, oleic acid, erucic acid, and the like. Illustrative monocarboxylic acids containing polyethylenic unsaturation include linoleic acid linolenic acid, ricinoleic acid, 9,11-octadecadienoic acid, 9,11,13-octadecatrienaic acid and the like. In addition, mixtures of mono- and polyethylenically unsaturated acids containing minor amounts (up to about 20 percent by weight) of saturated monocarboxylic acids are also useful herein. Examples of useful mixtures include sesame fatty acid, soybean fatty acid, sunflower fatty acid, hemp fatty acid, linseed fatty acid, tung fatty acid, oticica fatty acid, dehydrated castor fatty acid and the like.

The ethylenically unsaturated monocarboxylic acids useful herein may also be categorized on the basis of the number of carbon atoms in the ethylenically unsaturated acyl group

in the previous structural formula) bonded to the urea repeating group of the polymers of this invention. Thus, one useful category of ethylenically unsaturated monocarboxylic acid, and the

group from which it is derived, contains about 3 to about 6 carbon atoms, and more preferably, about 3 to about 4 carbon atoms, or mixtures thereof. These more preferred carboxylic acids are most preferably alpha-beta-unsaturated monocarboxylic acids; i.e., the ethylenic unsaturation is adjacent the

group. Another useful class of

group and the monocarboxylic acid from which the acyl group is derived are the ethylenically unsaturated, fatty monocarboxylic acids containing about 16 to about 22 carbon atoms or mixtures thereof. Examples of both of these classes of ethylenically unsaturated monocarboxylic acids are listed hereinabove, and it is understood that a minor amount of saturated monocarboxylic acid may also be present.

The polymeric carbodiimide, ethylenically unsaturated acid and resulting N-acylurea polymer are all soluble in volatile, inert organic solvents such as toluene, benzene, methyl ethyl ketone and the like, and in preferred practice, the polymeric carbodiimide and N-acylurea polymer are prepared in such a solvent. The resulting N-acylurea polymer is typically a liquid and may thereafter be used dissolved in the solvent, or neat (at 100 percent resin solids content).

The presence of the ethylenically unsaturated acyl group allows the N-acylurea polymers of this invention to cure during or after air drying on a coated substrate by a reaction of the ethylenic unsaturation of the acyl group. The cure may be effected by the use of ionizing radiation, ultraviolet radiation, free radical initiators, or by an air or oxygen induced mechanism. The term "air dry" means that the N-acylurea polymer will coalesce at normal room temperature when a coating composition is filmed upon a substrate and any volatile solvent present is allowed to evaporate. As the N-acylurea polymers of this invention are normally liquids, an uncured "air dried" film will normally be liquid.

When ionizing radiation provides the means for curing the coating, no curing agent is needed. A curing agent is preferably used when a coating is to be cured photochemically by means of ultraviolet light. Typical photochemical curing agents are photosensitizers such as the well-known ketonic photosensitizers, benzophenone or acetophenone, which are utilized in conventional amounts. Photochemically induced curing is preferably utilized in unpigmented compositions, and where the ethylenically unsaturated

group contains about 3 to about 6 carbon atoms and is alpha-beta-unsaturated. The term "ultraviolet light" is intended to include visible light near the ultraviolet range since such actinic radiation is also capable of inducing the desired cure.

Pigmented coating compositions are most preferably cured with a curing agent selected from drier salts such as those conventionally used for air curing unsaturated oils and alkyd resins. Suitable driers include cobalt, manganese and zirconium naphthenates, and metallic soaps such as nickel, tin, zinc or copper oleates and stearates, and the like and mixtures thereof. These drier salts promote curing by means of air, or oxygen in the air to provide an oxidative cure as is well-known in the art. The proportion of drier salt used is also well-known, and typically is about 0.1 percent to about 10 percent and preferably about 0.5 percent to about 3 percent, based upon the N-acylurea polymer solids. The N-acylurea polymers most preferably used in conjunction with drier salts are those having about 8 to about 22 carbon atoms in the ethylenically unsaturated acyl group.

Free radical initiating curing agents such as cumene hydroperoxide, azo-bis-isobutyronitrile, may also be used to cure the ethylenically unsaturated polymers of this invention. When so used, moderate heating of the initiator-containing composition, such as to about 60° C., may be employed.

The N-acylurea polymers of this invention are particularly useful as coatings and because of their low viscosity may constitute substantially all of a coating composition, except for pigment. In more preferred practice, the N-acylurea polymer of this invention are used in an amount of about 30 to about 95 weight percent of a coating composition, exclusive of pigment. Most preferably, the N-acylurea polymers of this invention may constitute about 70 to about 90 weight percent of a coating composition, exclusive of pigments.

Pigments may be suspended in the coating compositions as desired, and as is customary in the paint industry, without disturbing the cure capacity of the coating, except where light is used for cure.

The N-acylurea organic polymers of this invention may be made by first preparing the polymeric carbodiimide as is known in the art. This preparation normally takes place in an inert, volatile organic solvent such as toluene, xylene, diethyl ketone, cyclohexanone, methyl ethyl ketone, or the like, at about a 50–70 percent solids level. The ethylenically unsaturated monocarboxylic acid is then admixed in at least a stoichiometric amount, preferably slightly more than a stoichiometric amount, but desirably not more than a 30 percent excess, at a temperature of about 60°–80° C., and the resulting admixture is agitated until the reaction is complete; usually about one hour. The resulting reaction product is typically produced at 70–90 percent solids and may be used as such, diluted, or the solvent may be taken off prior to further use.

The curable coating compositions of the present invention may be almost entirely prepared from the N-acylurea polymer as made, either with the volatile, inert solvent present, or neat, without solvent. Such coating would typically be cured by ionizing radiation. More preferably, the coating compositions also contain a curing agent, as before described, and most preferably, pigment is also present. Taking the most preferred use as exemplary, the above produced N-acylurea polymer is admixed with a drier salt and pigment to form a pigmented suspension which will cure in the presence of oxygen when coated on a substrate.

A cured coating may be formed on a substrate by providing the substrate, and providing a coating composition of this invention. Thereafter, the substrate is coated with the composition of this invention, and then cured.

Long chain polyethylenic fatty monocarboxylic acids are preferably selected to provide pigmented solution coating compositions which contain a drier salt and which are cured at room or low temperature by an oxidative cure. Free radical initiated, radiation, and especially ultraviolet light cures, preferably involve the use of acrylic esters bonded to the urea repeating units.

BEST MODES OF CARRYING OUT THE INVENTION

EXAMPLE 1

A four-necked flask was equipped with a mechanical stirrer, a reflux condenser adapted with a gas outlet, a thermometer, and a dropping funnel containing 130.52 grams of 9,11-octadecadienoic acid and adapted with a nitrogen gas inlet. The flask was charged with tolylene diisocyanate (60.55 grams), phenyl isocyanate (27.44 grams), toluene (58 grams) and 1-phenyl-3-methyl phospholene-1-oxide (0.69 grams) in a nitrogen atmosphere. Agitation was begun and the contents of the flask were raised to a temperature of 80°–85° C. After two hours, infrared spectral analysis indicated that the reaction was complete by the absence of an isocyanate adsorption and a constant level of carbodiimide absorption.

After completion of the carbodiimide-forming reaction, the liquid 9,11-octadecadienoic acid was added dropwise over a period of one hour to the hot polymeric carbodiimide solution which was at a temperature of 60°–80° C., with continued agitation and nitrogen purging. The resulting solution was thereafter agitated for an additional hour and the toluene solvent removed under reduced pressure. On cooling to ambient temperature, the resulting curable polymer having a plurality of N-acylurea groups had a Brookfield viscosity of 13,800 c.p.s. Admixture of cobalt naphthenate (1.5% by weight of the total composition) and coating on a steel substrate resulted in a tack-free surface after exposure to air at ambient temperature for 40 minutes.

EXAMPLE 2

The preparation of Example 1 was repeated with linoleic acid replacing 9,11-octadecadienoic acid on a mole-to-mole basis. Use of 1.5% by weight cobalt naphthenate, based upon the total composition, and subsequent coating on a steel substrate, resulted in a tack-free surface in 30 minutes.

EXAMPLE 3

A four-necked flask was equipped with a mechanical stirrer, a thermometer, a reflux condenser adapted with a gas outlet, and a dropping funnel containing a mixture of isopropyl alcohol (4.16 grams) and poly(propylene glycol) (58.60 grams, average molecule weight of 423 grams/mole) and adapted with a nitrogen gas inlet. The flask was charged with tolylene diisocyanate (60.32 grams). The alcohol mixture was added dropwise to the flask over a period of 4 hours, with stirring and nitrogen purging, and the reaction temperature was controlled to remain at below 40° C. After an additional 2 hours of stirring, toluene (88 grams) and 1-phenyl-3-methyl phospholene-1-oxide (0.12 grams) were added to the flask. The temperature of the flask's contents was raised to 80° C., and maintained at that temperature for the next 24 hours, with continued stirring and nitrogen gas purging. Infrared spectroscopy was used to monitor the progress of the reaction as described in Example 1.

After completion of the formation of the polymeric carbodiimide, linoleic acid (48.97 grams) was added dropwise over a period of 2 hours to the polymeric carbodiimide which was at a temperature of 60° C. The resulting curable polymer having a plurality of N-acylurea groups was present in the solution at 65% by weight solids.

Cobalt naphthenate was added to the N-acylurea polymer solution in an amount to comprise 1.5% by weight of the total composition. Coating of the drier salt-containing composition on a steel panel resulted in a tack-free, elastic film after curing in air at ambient temperature for 18 hours.

EXAMPLE 4

A four-necked flask, equipped as in Example 3, was charged with tolylene diisocyanate (769 grams) while the dropping funnel contained isopropanol (106 grams). The isopropanol was added with stirring and nitrogen gas purging to the tolylene diisocyanate at a rate to maintain the temperature below 50° C. The resulting composition was allowed to stand in a nitrogen atmosphere for 18 hours, and then toluene (412 grams) and 1-phenyl-3-methyl phosphohen-1-oxide (3.59 grams) were added. The temperature of the flask contents was raised to 80° C. and the contents were maintained at that temperature for 4 hours to form the polymeric carbodiimide which is believed to have contained an average of about 4 carbodiimide groups per molecule.

Linseed fatty acid (1024.76 grams) was added dropwise under nitrogen and with stirring over a period of 30 minutes and while the flask contents were at ambient temperature. The reaction constituents were then agitated at ambient temperature for an additional hour to produce the N-acylurea polymer. At about 80% solids in toluene, this composition had a Brookfield viscosity of 11,400 c.p.s.

Cobalt naphthenate was admixed at 1.5% by weight of the total composition, and the composition was coated on a steel substrate to provide a fast curing, hard film.

EXAMPLE 5

A solvent-based paint formulation was prepared using the N-acylurea polymer of Example 4 at 80% by weight solids in toluene. The paint composition contained 316 grams of the polymer solution of Example 4, 183 grams of methyl ethyl ketone, 60 grams of toulene and 360 grams of pigments and fillers; 1.8 grams of cobalt nephthenate and 16.8 grams of zirconium naphthenate (as 12% solutions in mineral spirits) being incorporated as driers. The paint had a viscosity of 33 seconds using a No. 4 Ford cup at 70° F.

After coating on a steel panel and forced drying at 160° F. for 10 minutes, the paint composition exhibits good initial film hardness. In addition, corrosion resistance to salt-water sprays is also quite good.

What is claimed is:

1. A curable coating composition comprising an organic polymer containing a plurality of groups of the structural formula:

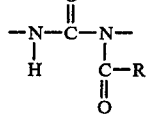

wherein

comprises a polyethylenically unsaturated acyl group derived from a polyethylenically unsaturated monocarboxylic acid containing about 16 to about 22 carbon atoms and mixtures thereof, said groups being present at an average of about 2.5 to about 6 per polymer molecule; said polymer being dissolved in an inert organic solvent at about 70 percent to about 90 percent by weight of said composition, exclusive of pigment; said composition additionally comprising a drier salt present at about 0.1 percent to about 10 percent based upon the weight of said polymer and pigment.

2. A curable organic polymer comprising a plurality of groups containing the structural formula:

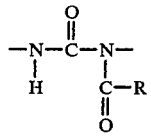

wherein

is derived from linseed fatty acid, and wherein there is present an average of about 2.5 to about 6 of the above groups per polymer molecule, and said groups are uniformly distributed.

3. A curable organic polymer comprising a plurality of groups containing the structural formula:

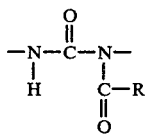

wherein

is derived from 9,11-octadecadienoic acid, and wherein there is present an average of about 2.5 to about 6 of the above groups per polymer molecule, and said groups are uniformly distributed.

4. A curable organic polymer comprising a plurality of groups containing the structural formula:

wherein
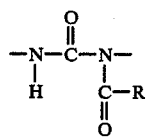
is derived from linoleic acid, and wherein there is present an average of about 2.5 to about 6 of the above groups per polymer molecule, and said groups are uniformly distributed.
* * * * *